3,264,371
FLUIDIZED BED COATING PROCESS AND PRODUCT

Harold M. Gruber and Laurence Haag, Reading, Pa., assignors to The Polymer Corporation, a corporation of Pennsylvania
No Drawing. Filed Mar. 13, 1959, Ser. No. 799,122
10 Claims. (Cl. 260—857)

This invention is concerned with a novel process for coating articles with a thermoplastic resin, with novel compositions employed in that process, and with the resulting novel coated products.

U.S. Patent 2,844,489 of Gemmer described a process for coating articles by immersing the heated article in a fluidized bed of pulverulent coating material. Prior to the present invention, however, despite numerous attempts, it has often been difficult to fluidize a bed successfully to obtain satisfactory fluidization and to produce coatings of a thermoplastic resin.

It has now been discovered that thermoplastic resin coatings may be applied to the surface of articles in a fluidized bed process by using a mixture of two types of resin. The first type of resin is a finely divided thermoplastic resin which should have a particle size (diameter) of between about 40 and about 325 mesh, preferably between 70 and 300 mesh. All mesh measurements were made with U.S. standard mesh screens. The material may be polyethylene, nylon (a long chain synthetic polymeric amide which has recurring amide groups as an integral part of the main polymer chain, and which is capable of being formed into a filament in which the structural elements are oriented in the direction of the axis), plasticized polyvinyl chloride, or plasticized vinyl chloride copolymers, such as the vinyl chloride-vinylacetate and vinyl chloride-vinylidene chloride types.

The second type of resin in the coating mixture is polyvinyl chloride having a particle size much smaller than that of the main body of powder. "Paste grade" polyvinyl chloride resins which are usually prepared by emulsion polymerization and spray drying are characterized by very small particle size. Commercially available paste grade resins generally have a particle size in the range of from about 0.1 to about 2.0 microns in diameter. For the purposes of the present invention, the second component, i.e. the polyvinyl chloride resin, should be of average particle size less than 5 microns in diameter, and preferably less than 3 microns. It is most preferred that the particle size be below 0.5 micron, and that the molecular weight be medium rather than high, the latter having the widest conventional usage.

It should be noted that as the second component there may be used not only a polymer which is 100% polyvinyl chloride, but also a copolymer thereof, for example vinyl chloride and vinyl acetate, in which vinyl chloride is present in the major amount. In all cases, however, the particle size must be no greater than 5 microns.

In the process of the present invention, from about 0.5 to about 10% of the paste grade polyvinyl chloride resin powder (or similar material within the particle size range set forth above) is intimately mixed with the pulverized thermoplastic resin powder. The mixing must be such that all agglomerates are broken up and the very small particles are intimately dispersed among the particles of the thermoplastic resin. A Henschel mill, a Patterson-Kelly mill or a Gump screening operation may be employed. The addition of the paste grade resin in the proper proportion greatly improves the fluidizing characteristics of the resin, diminishes or removes caking tendency, and results in a high quality of coating. Unless sufficient paste grade resin has been added, the fluidized powder bed often tends to pack together and form agglomerates, and poor fluidizing properties are obtained. On the other hand, when an excessive amount of the paste grade resin is added, the desired fluidizing properties of the bed are impaired, as are the coating characteristics.

The types of resin to be mixed together to form the novel coating composition of the present invention are available commercially. The paste type polyvinyl chloride resins have in the past generally been used in the formation of plastisols. They are characterized by a high molecular weight and very small particle size. The polyvinyl chloride resin of 40 to 325 mesh particle size, while not used for the purpose of forming plastisols, are, however, used in conjunction with plasticizers.

There are many and various known types of plasticizers suitable for use with polyvinyl chloride resins. The particular type of plasticizer to be employed is not a critical feature of the present invention, but rather any type of plasticizer known to be compatible with polyvinyl chloride may be used. The choice of the optimum plasticizer may be made, in a manner well known to the art, depending upon the final use intended for the coated article. Many such plasticizers for polyvinyl chloride are known and are discussed in numerous literature publications, an example being the publication entitled "Effects of Plasticizers Upon Dry Blending Polyvinyl Chloride Resins," published September 1957 by the Firestone Plastics Company, Division of Firestone Tire and Rubber Company, Pottstown, Pennsylvania.

Those skilled in the art will recognize that in commercial usage polyvinyl chloride resins are blended with various ingredients to enhance their suitability for particular applications. Heat stabilizers, light stabilizers, antifungal agents, fillers and pigments have all been incorporated in polyvinyl chloride resins, and the resins of the present invention may also contain them. The use of such materials, however, is not a critical feature of the present invention. Discussions of the use of such additives are available in the technical literature, for example, in the Modern Plastics Encyclopedia, issue for 1959, published in September 1958, by Plastics Catalog Corporation, Bristol, Connecticut.

It is widely known that polyvinyl chloride resins must be heat stabilized for use, or else degradation of the resin at elevated fabricating temperatures occur, thereby discoloring the resin and liberating hydrogen chloride. The second component in this invention, "the paste grade resin," is unusual in that no heat stabilizers need be added to it (although they could be added). The fact that an excellent vinyl coating results, even when the application temperature is as high as 500–600° F. is therefore both unexpected and novel.

In the preparation of the 40–325 mesh polyvinyl chloride resin, the resin is first mixed with a plasticizer. During the mixing, the plasticizer is adsorbed, and the resin takes on the properties of a dry solid. It is then extruded, sheeted, chipped, and ground to the desired size at very low temperatures, generally using liquid nitrogen for cooling purposes.

In carrying out the process of the present invention, the 40 to 325 mesh particle size thermoplastic resin is dry blended with 0.5 to about 10% by weight of the paste grade polyvinyl chloride resin having a particle size of less than 5 microns in diameter. The mixture is then applied to the article to be coated by the method described in Patent 2,884,489 of Gemmer. The novel mixtures of the present invention have the unique and surprising advantage of providing powders which fluidize properly in the fluidized bed coating operation have freedom from caking, and produces satisfactory coatings.

The optimum amount of paste grade polyvinyl chloride to be incorporated in the mixture will vary somewhat depending upon the particular thermoplastic resin used, and also upon the particular plasticizer used for the 40–325 mesh polyvinyl chloride resin, and also upon the amount of plasticizer used and upon the particle size and size ditsribution of the thermoplastic resin. Satisfactory results, however, may be obtained within the above mentioned range of about 0.5 to about 10%.

The following examples are given solely for purposes of illustration and are not to be considered as limiting the invention to these embodiments. Many modifications will be apparent to those skilled in the art without departing from the spirit or scope of the invention. In the following examples, the quantities of ingredients are to be understood as expressed in parts by weight.

*Example 1*

A stabilized plasticized polyvinyl resin was formulated in the following manner: 60.00 parts of medium molecular weight polyvinyl chloride (VR–25, Naugatuck Chemical) was blended with 8.25 parts of epoxidized soya fatty acids (Paraplex G–62, Rohm & Haas), 19.50 parts of Benzoflex 9–88 (Tennessee Chemical Products) dipropylene glycol dibenzoate and 24 parts of a dispersion of plasticizer and stabilizer. The dispersion of plasticizer and stabilizer was made by mixing 4 parts of a mixture of 1.5 parts Mark WS barium cadmium soap (Argus Chemical Company), 0.75 part Mark C organic chelating agent (Argus Chemical Company) and 1.75 parts Paraplex G–62 with 70 parts of a mixture of 70 parts titanium dioxide (R–500, Du Pont) and 30 parts Paraplex G–62. Mark WS barium cadmium soap is a material available commercially. It is an organic soap for the stabilization of rigid and plasticized polyvinyl chloride. It is a fine white powder having a specific gravity of 1.27, a moisture content of 1.0 (maximum) and is used in concentrations of 0.75–1.5 parts per 100 parts of resin. Mark C organic chelating agent is identified as an organic chelating agent recommended for use in conjunction with metallic compounds for the stabilization of polyvinyl chloride. It is a clear liquid soluble in esters, ethers and most organic solvents. It is insoluble in water. All the ingredients in the dispersion were mixed together on a three-roll mill. The final mixture contained a total of 59 parts of plasticizer by weight per hundred parts of polyvinyl chloride resin. With this mixture there was mixed 5 parts of a paste grade polyvinyl chloride resin having a particle size of between 0.1 to 2.0 microns (sold by Goodyear Tire & Rubber Company under the trademark Geon 126) per hundred parts of powder. The mixing was carried out on a Henschel mill thereby breaking up all agglomerates and intimately dispersing the particles of Geon 126 among the particles of the plasticized polyvinyl chloride. The resulting powder fluidized well, and displayed a minimum tendency to pack or cake on storage. It resulted in good coatings. By way of comparison it should be mentioned, that none of the straight vinyl powders described below, i.e. powders without the Geon 126 additive, fluidized satisfactorily. Channeling, geyser formation, and non-uniform fluidization of the powder was obtained with consequent poor coating characteristics.

*Example 2*

45.00 parts of a medium molecular weight copolymer of 87% vinyl chloride and 13% vinyl acetate (VYHH, Bakelite Company) was blended with 15 parts of a medium molecular weight copolymer of vinyl chloride-vinylidene chloride (X–2716, Dow Chemical Company), 1.25 parts Paraplex G–62, 9.0 parts n-octyl-n-decyl phthalate (Hercoflex 150, Hercules Powder Company), 9.0 parts chlorinated waxes (Chlorowax 70S, Diamond Alkali Company) and 24 parts of the dispersion of a plasticizer and stabilizer described in the preceding example. Chlorowax 70S is a cream-colored powdered nontoxic resinous chlorinated paraffin having a specific gravity of 1.6–1.7, and a melting point of 90 to 100° C. It is insoluble in water and soluble in hydrocarbons, ketones, esters, nitroparaffins and chlorinated hydrocarbons. It is compatible with drying oils, resins, vinyl plastics, chlorinated rubber, synthetic rubbers, natural waxes and gums. It does not oxidize, polymerize or condense. It decomposes slowly at 135° C. with evolution of hydrogen chloride. It can be stabilized to higher temperatures by using specific stabilizers. The total plasticizer content of the resin was 30 parts of plasticizer per hundred parts of resin by weight. To this powder formulation there was intimately mixed (as in Example 1) 3 parts of the paste grade resin of Example 1 per hundred parts of powder. Satisfactory fluidizing and storage characteristics were obtained, as were satisfactory coatings.

*Example 3*

A resin was formulated containing 60 parts medium molecular weight polyvinyl chloride (VR–25, Naugatuck Chemical), 4.25 parts Paraplex G–62, 13 parts Benzoflex 9–88, trace of a color pigment (Harman G–5005) and 24 parts of the dispersion of plasticizer and stabilizer described in Example 1 above. Harman G–5005 is a phthalocyanine green pigment dispersed in polyvinyl chloride resin having a color index of 7. It is one of the line of organic pigments in various light-fast brilliant colors. The final plasticizer of the resin content was 42 parts per hundred parts of resin by weight. To this powder there was intimately mixed (as in Example 1) 2 parts of the paste grade resin of Example 1 per hundred parts of powder. The mixture had good fluidizing characteristics and only a slight tendency to form cakes.

*Example 4*

The powder formulation was exactly as in Example 3, but in this case 5 parts of a paste grade resin of Example 1 per hundred parts of powder was mixed in. The mixture fluidizing well, with minimum tendency to cake.

*Example 5*

The same powder formulation was used as in Example 3, but 7 parts of the paste grade resin of Example 1 were added with intimate mixing. The results were the same as before, good fluidizing with minimum tendency to cake.

*Example 6*

The same powder formulation as used in Example 1 was used, but in this case 3 parts per hundred of powder of a paste grade polyvinyl chloride resin having a particle size between about 0.1 to 2.0 microns and sold by the Firestone Tire & Rubber Company under the trademark Exon 654 were employed. The results were good fluidizing and minimum caking tendency.

*Example 7*

Heat stabilized, medium molecular weight, low density grade polyethylene in powder form passing through a 70 mesh screen was placed in a tank and aerated in an attempt to fluidize it. This powder would not fluidize properly, but channeled badly regardless of the amount of air employed.

*Example 8*

To the same polyethylene formulation described above in Example 7, 3 parts per hundred of the paste grade resin of the Example 1 was added and intimately mixed. Upon attempting to fluidize this material, it was found to have good fluidizability.

*Example 9*

Approximately again as much polyethylene was intimately mixed with the above described final blend of Example 8. Upon attempting to fluidize this material, it was found to be greatly improved over Example 7 even though the polyethylene contained only 1 to 1½ parts per hundred of Geon 126.

Example 10

A heat stabilized type 6 nylon (polymerized ε-caprolacam) (Plaskon 8201HS, Allied Chemical), was pulverized and passed through a 50 mesh screen. Satisfactory fluidizing could not be obtained.

Example 11

1 part of the paste grade resin of Example 1 was intimately mixed with each 100 parts of the powder of Example 10. Good fluidization was obtained.

Example 12

3 parts of the paste grade resin of Example 1 was intimately mixed with each 100 parts of the powder of Example 10. Good fluidization was obtained.

Example 13

5 parts of the paste grade resin of Example 1 was intimately mixed with 100 parts of the powder of Example 10. Good fluidization was obtained.

What is claimed is:

1. A process for applying to an article a coating of a thermoplastic resin selected from the group consisting of (1) plasticized polyvinyl chloride, (2) plasticized vinyl chloride-vinyl acetate copolymers, (3) plasticized vinyl chloride-vinylidene chloride compolymers, (4) a long chain synthetic polymeric amide which has recurring amide groups as an integral part of the main polymer chain, and which is capable of being formed into a filament in which the structural elements are oriented in the direction of the axis, and (5) polyethylene, said process comprising immersing the article in a fluidized bed comprising the thermoplastic resin having a particle size of from about 40 to about 325 mesh, and from about 0.5 to about 10% by weight of polyvinyl chloride having a particle size of less than 5 microns in diameter which is intimately dispersed among the particles of the thermoplastic resin.

2. A process as described in claim 1 wherein the polyvinyl chloride of particle size less than 5 microns is a paste grade resin.

3. A process as described in claim 1 wherein said thermoplastic resin is polyvinyl chloride.

4. A process as described in claim 1 wherein said thermoplastic resin is a copolymer of vinyl chloride and vinyl acetate.

5. A process as described in claim 1 wherein said thermoplastic resin is polyethylene.

6. A process as described in claim 1 wherein the thermoplastic resin is a long chain synthetic polymeric amide which has recurring amide groups as an integral part of the main polymer chain, and which is capable of being formed into a filament in which the structural elements are oriented in the direction of the axis.

7. A free flowing fluidizable pulverulent composition of matter comprising an intimate mixture of plasticized polyvinyl chloride having a particle size of from about 40 to about 325 mesh and from about 0.5 to about 10 weight percent of polyvinyl chloride having an average particle size of less than 5 microns in diameter.

8. A free flowing fluidizable pulverulent composition of matter comprising an intimate mixture of polyethylene having a particle size of from about 40 to about 325 mesh and from about 0.5 to about 10% by weight of polyvinyl chloride having an average particle size of less than 5 microns in diameter.

9. A free flowing fluidizable pulverulent composition of matter comprising an intimate mixture of a long chain synthetic polymeric amide which has recurring amide groups as an integral part of the main polymer chain which is capable of being formed into a filament in which the structural elements are oriented in the direction of the axis having a particle size of from about 40 to about 325 mesh, and from about 0.5 to about 10 weight percent polyvinyl chloride having an average particle size of less than 5 microns in diameter.

10. A free flowing fluidizable pulverulent composition of matter comprising an intimate mixture of a plasticized vinyl chloride copolymer of the group consisting of vinyl chloride-vinyl acetate copolymers and vinyl chloride-vinylidene chloride copolymers having a particle size of from about 40 to about 325 mesh and from about 0.5 to about 10 weight percent of polyvinyl chloride having an average particle size of less than 5 microns in diameter.

References Cited by the Examiner

UNITED STATES PATENTS

| | | | |
|---|---|---|---|
| 2,491,102 | 12/1949 | Frowde | 260—857 |
| 2,600,122 | 6/1952 | Meyer | 260—34.2 |
| 2,628,208 | 2/1953 | Loukomsky | 260—857 |
| 2,835,620 | 5/1958 | Bartlett | 260—857 |
| 2,844,489 | 7/1958 | Gemmer | 117—21 |
| 3,001,228 | 9/1961 | Nack | 117—21 |
| 3,028,251 | 4/1962 | Nagel | 117—21 |

OTHER REFERENCES

Larian, M.G.: Fundamentals of Chemical Engineering Operations, Prentice-Hall, N.J., 1958 (p. 220–222 relied on).

Stott: "Fluidized Bed Method of Coating," Organic Finishing, June 1956, page 16 relied on.

MURRAY TILLMAN, *Primary Examiner.*

DAN ARNOLD, WILLIAM H. SHORT, LEON J. BERCOVITZ, *Examiners.*

R. N. COE, H. L. SATZ, J. A. KOLASCH, E. J. TROJNAR, *Assistant Examiners.*